United States Patent
Patel et al.

(10) Patent No.: US 12,308,670 B2
(45) Date of Patent: *May 20, 2025

(54) WIRELESS POWER SYSTEM WITH COMMUNICATIONS

(71) Applicant: Apple Inc., Cupertino, CA (US)

(72) Inventors: Parin Patel, San Jose, CA (US); Daniel P. Kumar, Fremont, CA (US); Andrew C. Chang, Sunnyvale, CA (US)

(*) Notice: Subject to any disclaimer, the term of this patent is extended or adjusted under 35 U.S.C. 154(b) by 590 days.

This patent is subject to a terminal disclaimer.

(21) Appl. No.: 17/409,378

(22) Filed: Aug. 23, 2021

(65) Prior Publication Data

US 2022/0077723 A1    Mar. 10, 2022

Related U.S. Application Data

(62) Division of application No. 17/028,404, filed on Sep. 22, 2020, now Pat. No. 11,121,590.

(Continued)

(51) Int. Cl.
*H02J 50/90* (2016.01)
*G06K 7/10* (2006.01)
(Continued)

(52) U.S. Cl.
CPC .......... *H02J 50/90* (2016.02); *G06K 7/10297* (2013.01); *G06K 19/0723* (2013.01); *H01Q 7/00* (2013.01); *H02J 7/00045* (2020.01); *H02J 7/0047* (2013.01); *H02J 7/02* (2013.01); *H02J 50/12* (2016.02); *H02J 50/60* (2016.02); *H02J 50/80* (2016.02); *H04B 5/79* (2024.01); *H04W 12/06* (2013.01)

(58) Field of Classification Search
CPC .. H02J 50/12; H02J 50/60; H02J 50/80; H02J 50/90; H02J 7/00045; H02J 7/02; H02J 7/0047; H04B 5/79; H01Q 7/00; G06K 7/10297; G06K 19/0723; H04W 12/06
USPC ................................ 320/107, 108, 114, 115
See application file for complete search history.

(56) References Cited

U.S. PATENT DOCUMENTS 8,169,185 B2   5/2012   Partovi et al.
9,020,425 B2   4/2015   Symons
(Continued)

FOREIGN PATENT DOCUMENTS

CN    110474436 A    11/2019
JP    2020502970 A    1/2020

OTHER PUBLICATIONS

Qian et al., Magnetic Positioning Technique Integrated with Near-Field Communication for Wireless EV Charging, Energies 2020, 13, 1081, Mar. 1, 2020, pp. 1-22.

(Continued)

*Primary Examiner* — Edward Tso
*Assistant Examiner* — Aaron Piggush
(74) *Attorney, Agent, or Firm* — Treyz Law Group, P.C.; Jason Tsai; Joseph F. Guihan

(57) ABSTRACT

A wireless power system may include an accessory configured to transfer or relay wireless power to a portable electronic device. The portable electronic device may include wireless charging circuitry and sensors configured to detect compatible accessories currently coupled with the portable electronic device. The portable electronic device performs wireless charging or related functions in accordance with the coupled accessories.

20 Claims, 10 Drawing Sheets

Related U.S. Application Data

(60) Provisional application No. 63/075,035, filed on Sep. 4, 2020.

(51) Int. Cl.

| | | |
|---|---|---|
| *G06K 19/07* | (2006.01) | |
| *H01Q 7/00* | (2006.01) | |
| *H02J 7/00* | (2006.01) | |
| *H02J 7/02* | (2016.01) | |
| *H02J 50/12* | (2016.01) | |
| *H02J 50/60* | (2016.01) | |
| *H02J 50/80* | (2016.01) | |
| *H04B 5/79* | (2024.01) | |
| *H04W 12/06* | (2021.01) | |

(56) References Cited

U.S. PATENT DOCUMENTS

| | | | |
|---|---|---|---|
| 9,130,601 B2 | 9/2015 | Huomo | |
| 9,204,393 B2 | 12/2015 | Parco et al. | |
| 9,356,659 B2 | 5/2016 | Partovi | |
| 9,398,456 B2 | 7/2016 | Jadhav et al. | |
| 9,461,501 B2 | 10/2016 | Partovi et al. | |
| 9,496,744 B2 | 11/2016 | Porat et al. | |
| 9,537,353 B1 | 1/2017 | Bossetti et al. | |
| 9,739,844 B2 | 8/2017 | Widmer et al. | |
| 9,755,437 B2 | 9/2017 | Kuusilinna et al. | |
| 9,769,300 B2 | 9/2017 | Griffin et al. | |
| 9,973,038 B2 | 5/2018 | Li et al. | |
| 10,072,947 B1 | 9/2018 | Mantler | |
| 10,105,545 B2 | 10/2018 | Aghassian | |
| 10,112,496 B2 | 10/2018 | Nguyen | |
| 10,193,372 B2 | 1/2019 | Herbst et al. | |
| 10,275,761 B2 | 4/2019 | Lee et al. | |
| 10,321,279 B2 | 6/2019 | Szeto | |
| 10,340,728 B2 | 7/2019 | Yasuda | |
| 10,341,787 B2 | 7/2019 | Blum et al. | |
| 10,642,385 B1 | 5/2020 | Song et al. | |
| 10,652,384 B1 | 5/2020 | Lin | |
| 11,011,249 B2 | 5/2021 | Khan et al. | |
| 2008/0081608 A1 | 4/2008 | Findikli et al. | |
| 2009/0009233 A1* | 1/2009 | Shah | H03K 17/97 |
| | | | 327/510 |
| 2011/0070828 A1 | 3/2011 | Griffin et al. | |
| 2012/0235636 A1 | 9/2012 | Partovi | |
| 2013/0024059 A1 | 1/2013 | Miller et al. | |
| 2013/0303085 A1 | 11/2013 | Boucher et al. | |
| 2014/0148096 A1 | 5/2014 | Bhatnagar et al. | |
| 2014/0379575 A1 | 12/2014 | Rogan | |
| 2015/0022194 A1 | 1/2015 | Almalki et al. | |
| 2015/0091524 A1 | 4/2015 | Park et al. | |
| 2015/0121108 A1 | 4/2015 | Agrawal et al. | |
| 2015/0303699 A1 | 10/2015 | Wagman et al. | |
| 2016/0094078 A1* | 3/2016 | Graham | H02J 50/50 |
| | | | 320/108 |
| 2016/0210616 A1 | 7/2016 | Lee et al. | |
| 2016/0211889 A1 | 7/2016 | Bosscher et al. | |
| 2017/0110911 A1* | 4/2017 | Bossetti | H02J 50/90 |
| 2017/0170678 A1 | 6/2017 | Uhm | |
| 2017/0237278 A1 | 8/2017 | Zhang | |
| 2018/0019623 A1 | 1/2018 | Tsukamoto et al. | |
| 2018/0183254 A1 | 6/2018 | Park et al. | |
| 2018/0351414 A1 | 12/2018 | Park | |
| 2019/0074706 A1 | 3/2019 | Wittenberg et al. | |
| 2019/0074719 A1 | 3/2019 | Wittenberg et al. | |
| 2019/0097447 A1 | 3/2019 | Partovi | |
| 2019/0097448 A1 | 3/2019 | Partovi | |
| 2019/0123588 A1* | 4/2019 | Kim | H02J 50/12 |
| 2019/0123929 A1 | 4/2019 | Lee et al. | |
| 2019/0217737 A1 | 7/2019 | Lotfy | |
| 2020/0036227 A1 | 1/2020 | Kim et al. | |
| 2020/0227954 A1* | 7/2020 | Ding | H02J 50/10 |
| 2020/0297087 A1 | 9/2020 | Mora et al. | |
| 2020/0343775 A1 | 10/2020 | Yahagi et al. | |
| 2022/0077724 A1* | 3/2022 | Patel | H02J 7/00045 |

OTHER PUBLICATIONS

Li et al., Electromagnetic Induction Position Sensor Applied to Anti-Misalignment Wireless Charging for UAVs, IEEE Sensors Journal, vol. 20, Issue 1, Sep. 11, 2019, pp. 515-524, IEEE.

* cited by examiner

WIRELESS POWER SYSTEM WITH COMMUNICATIONS

This application is a division of non-provisional patent application Ser. No. 17/028,404, filed Sep. 22, 2020, which claims the benefit of provisional patent application No. 63/075,035, filed Sep. 4, 2020, both of which are hereby incorporated by reference herein in their entireties.

FIELD

This relates generally to power systems, and, more particularly, to wireless power systems for charging battery-powered electronic devices.

BACKGROUND

In a wireless charging system, a wireless power transmitting device such as a charging mat wirelessly transmits power to a wireless power receiving device such as a battery-powered, portable electronic device. The wireless power transmitting device has a coil that produces electromagnetic flux. The wireless power receiving device has a coil and rectifier circuitry that uses electromagnetic flux produced by the transmitter to generate direct-current power that can be used to power electrical loads in the battery-powered portable electronic device.

SUMMARY

A wireless charging system includes an electronic device operable with an accessory. In accordance with some embodiments, the electronic device can include a wireless charging coil, near-field communications circuitry having a near-field communications antenna around the wireless charging coil, a magnetic alignment structure configured to align the near-field communications antenna with a corresponding near-field communications antenna in the accessory when the magnetic alignment structure is magnetically coupled to the accessory, a magnetic sensor configured to detect when the magnetic alignment structure is magnetically coupled to the accessory, and an output device. The near-field communications circuitry can be configured to retrieve information from the accessory in response to detecting that the magnetic alignment structure is magnetically coupled to the accessory. The output device can be configured to present an output associated with the accessory using the retrieved information.

The near-field communications antenna can run along an inner or outer peripheral edge of the wireless charging coil. The magnetic alignment structures can run along an inner or outer peripheral edge of the near-field communications antenna. The output device can be a display configured to present a wireless charging mat icon, a wireless charging puck icon, a removable case icon, a battery case icon, a dock icon, a physical characteristic such as a color of the accessory, a functionality associated with the accessory, and ownership information associated with the accessory. The output device can also provide audio, haptic, or other visual feedback when the device attaches to the accessory. Near-field communications can be performed while wireless power handshake operations are paused or while wireless power transfer operations are halted.

In accordance with some embodiments, a method of operating an electronic device with an accessory is provided. Such method can include using a magnet to magnetically attract a corresponding magnet in the accessory, using a magnetic sensor to detect when the magnet is magnetically attracting the corresponding magnet in the accessory, using near-field communications circuitry to receive information from the accessory in response to detecting that the magnet is magnetically attracting the corresponding magnet in the accessory, and using a display to display an output associated with the accessory based on the retrieved information. The method can further include using a wireless charging coil to receive wireless power signals from the accessory and charging a battery with the wireless power signals. The method can further include performing near-field communication authentication operations while wireless power handshake operations are temporarily paused or while active wireless power transfer is temporarily halted.

In accordance with some embodiments, an electronic device operable in a wireless power system to receive wireless power signals from a power transmitting device is provided. The electronic device can include a wireless power receiving coil configured to receive the wireless power signals, a near-field communications reader with a near-field communications antenna that runs along a peripheral edge of the wireless power receiving coil, a magnet at least partially surrounding the near-field communications antenna, where the magnet is configured to magnetically coupled to a corresponding magnet in the power transmitting device to align the wireless power receiving coil with a wireless power transmitting coil in the power transmitting device, and a magnetic sensor configured to detect when the magnet is magnetically coupled to an external accessory separate from the power transmitting device and when the magnet is magnetically coupled to both the external accessory and the power transmitting device. The magnetic sensor can differentiate between when the magnet is only magnetically coupled to the external accessory and when the magnet is magnetically coupled to both the external accessory and the power transmitting device. The power transmitting device can include a first near-field communications tag configured to transmit information about the power transmitting device to the near-field communications reader. The external accessory comprises a second near-field communications tag configured to transmit information about the external accessory to the near-field communications reader. The near-field communications reader can perform anti-collision operations when multiple tags are detected. When collisions are detected, the near-field communications reader may communicate with only one of the tags while the other tag is halted, before halting the tag that was just read and then reading the tag that was first halted.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a portable device such as a wristwatch, cellular telephone, tablet computer, laptop computer, or other electronic equipment, as examples. The wireless power transmitting and receiving device may be an electronic device case (e.g., a removable case for a cellular telephone) or other type of electronic device. The wireless power transmitting device may wirelessly transmit power to a wireless power receiving device. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

Figure 1:
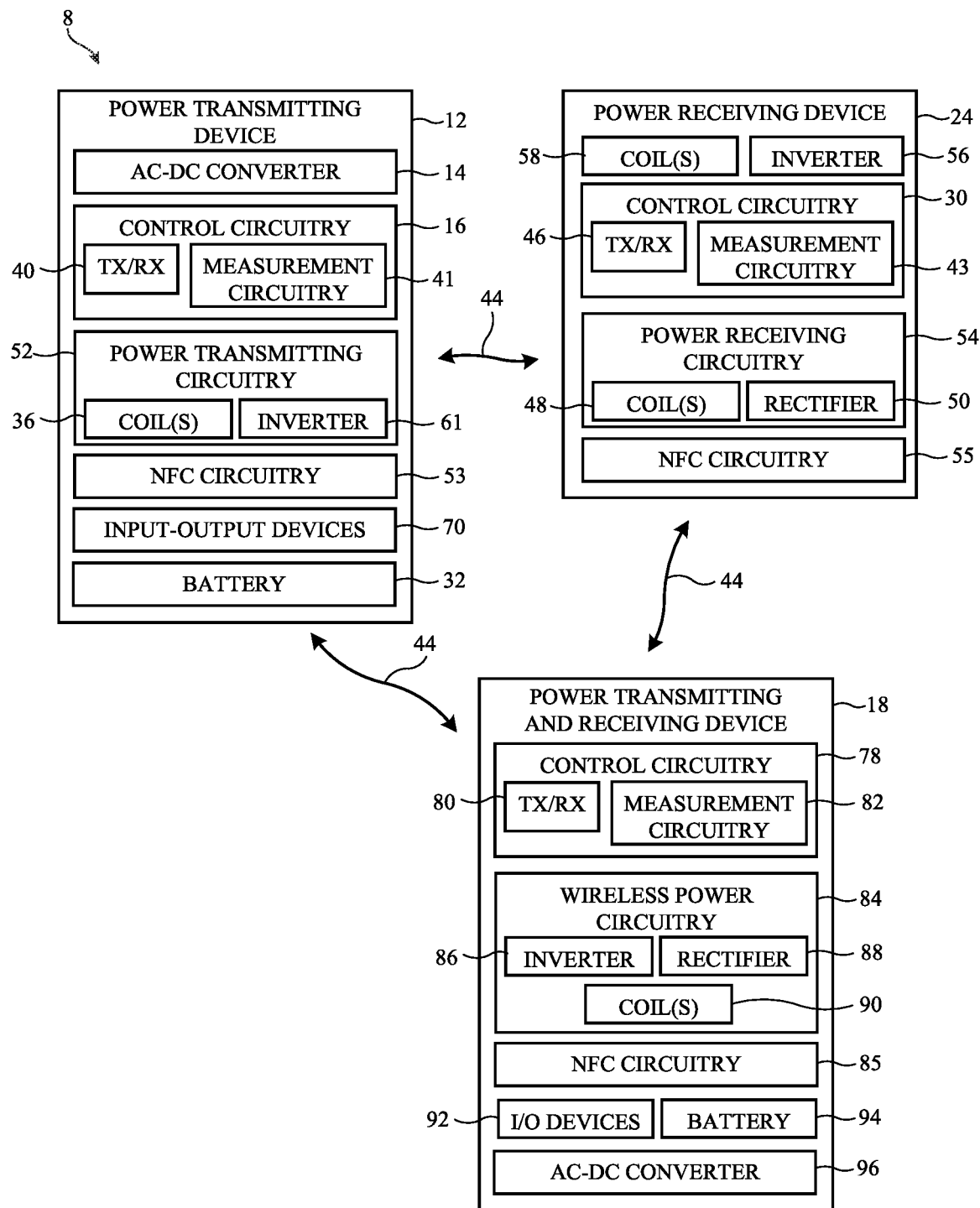
FIG. 1 is a block diagram of an illustrative wireless power system in accordance with some embodiments.

An illustrative wireless power system (wireless charging system or wireless power transfer system) is shown in FIG. 1. Devices in wireless power system 8 may include wireless power transmitting devices such as wireless power transmitting device 12. Devices in wireless power system 8 may include wireless power receiving devices such as wireless power receiving device 24. Devices in wireless power system 8 may include electronic devices capable of both transmitting and receiving wireless power such as wireless power transmitting and receiving device 18.

Exemplary wireless power transmitting device 12 includes control circuitry 16. Exemplary wireless power receiving device 24 includes control circuitry 30. Exemplary wireless power transmitting and receiving device 18 includes control circuitry 78. These control circuitries may include processing circuitry associated with microprocessors, power management units, baseband processors, digital signal processors, microcontrollers, and/or application-specific integrated circuits with processing circuits. These processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations/handshakes between devices 12, 18, and 24, sending and receiving in-band and out-of-band data, making measurements, and otherwise controlling the operation of respective wireless transmitters and receivers in system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wristwatch, a cellular telephone, a laptop computer, a tablet computer, an accessory such as an earbud or an electronic pencil (e.g., a stylus), a head-mounted display, or other electronic equipment. Power transmitting device 12 may be coupled to a wall outlet (e.g., an alternating current power source), may have a battery 32 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some embodiments, device 12 (e.g., a charging mat, puck, etc.) may have only a single coil. In other embodiments, a wireless charging device may have multiple coils.

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Rectifier circuitry such as rectifier circuitry 50 converts received AC signals (received alternating-current signals associated with electromagnetic signals 44) from one or more coils 48 into DC voltage signals for powering device 24. The DC voltage produced by rectifier circuitry 50 (sometime referred to as rectifier output voltage Vrect) can be used in charging a battery such as battery 58 and can be used in powering other components in device 24.

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals.

In illustrative embodiments, device 12 includes near-field communications (NFC) circuitry 53 for transmitting information to corresponding NFC circuitry 55 in device 24. Device 18 may also include NFC circuitry 85 for receiving information from device 12 and/or transmitting information to device 24. Data conveyed using these NFC components may also be considered out-of-band signals and may be radiated using a separate NFC antenna within each device. Each NFC circuitry may include circuitry that operates as an NFC reader (sometimes referred to as a proximity coupling device or PCD) and/or as an NFC tag (sometimes referred to as a proximity inductive coupling card or PICC). An NFC tag may be active or passive. An active NFC tag can actively transmit a signal to the NFC reader, whereas a passive NFC tag modulates the carrier waveform transmitted by the NFC reader. Exemplary NFC communications operate at 13.56 MHz. In some embodiments, NFC communications may employ millimeter/centimeter wave technologies at 10 GHz or above (to about 300 GHz).

Wireless transceiver circuitry 40, 46, and 80 may also be used for in-band transmissions between devices 12, 24, and 18 using coils 36, 48, and 90. Frequency-shift keying (FSK) and/or amplitude-shift keying (ASK) may be used to convey in-band data between devices 12, 18, and 24. Power may be conveyed wirelessly during these FSK and ASK transmissions. It is desirable for power transmitting device 12, power transmitting and receiving device 18, and power receiving device 24 to be able to communicate information such as received power, battery states of charge, and so forth, to control wireless power transfer. Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, and/or other housing wall structures that enclose coil(s) 36 and other circuitry of device 12. The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24, so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 18 or 24) is present on device 12.

Power transmitting and receiving device 18 may be a battery case or a battery pack that is coupled to a power adapter or other equipment by a cable, may be equipment that has been incorporated into furniture, a vehicle, or other system, may be a removable battery case, may be a portable electronic device such as a wrist watch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay or pass through received wireless power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all used for both wireless power transmission and wireless power reception. Different coils in device 18 may optionally be shorted together in different modes of operation.

Figure 2:
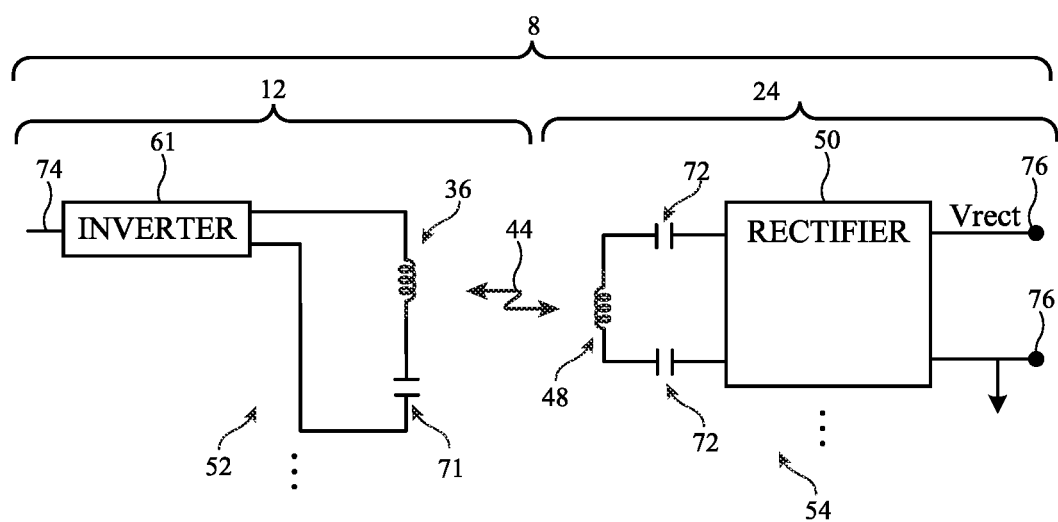
FIG. 2 is a circuit schematic of illustrative wireless power transmitting and receiving circuitry in accordance with some embodiments.

FIG. 2 is a circuit diagram of illustrative wireless charging circuitry useful in implementing system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. In general, wireless power may simultaneously be conveyed between devices during in-band communications (using ASK or FSK).

The power transmission frequency used for transmission of wireless power may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90 in FIG. 1) may be considered in-band signals.

Figure 3:
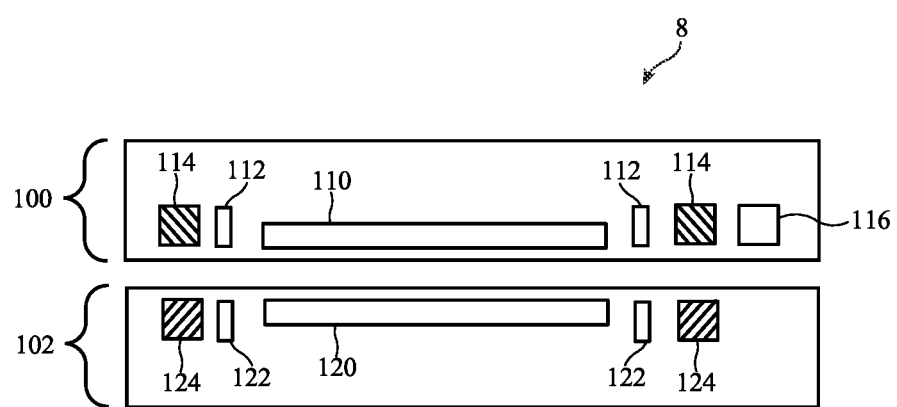
FIG. 3 is a cross-sectional side view of an illustrative wireless charging system in accordance with some embodiments.

FIG. 3 is a cross-sectional side view of a portable electronic device 100 (e.g., a wrist watch, a cellular telephone, a laptop computer, a tablet computer, or other electronic equipment) on the surface of wireless charging mat (or puck) 102. Device 100 may be a wireless power receiving device (e.g., device 24 in FIG. 1) or may be a wireless power transmitting and receiving device (e.g., device 18 in FIG. 1). Device 102 may be a wireless power transmitting device (e.g., device 12 in FIG. 1).

As shown in FIG. 3, device 102 may include a wireless charging coil 120 (e.g., a wireless power transmitting coil), an NFC antenna structure 122, and magnetic alignment structure 124. Wireless charging coil 120 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils. Coil 120 may represent a single coil or multiple coils (e.g., a planar coil array, a cluster of coils, or any suitable number of overlapping and/or non-overlapping coil structures). NFC antenna 122 may be formed around wireless charging coil 120 (e.g., NFC antenna 122 may be routed along the inner or outer periphery of coil 120 and may at least partially or completely surround coil 120). In one suitable arrangement, wireless charging coil 120 and NFC antenna 122 may form concentric loop structures. Magnetic alignment structure 124 may be formed around NFC antenna 122 (e.g., alignment structure 124 may be formed along the periphery of antenna 122 and may at least partially or completely surround antenna 122). In some configurations, NFC antenna 122 and magnetic alignment structure 124 may form concentric loops.

Device 100 may include a wireless charging coil 110 (e.g., a wireless power receiving coil), an NFC antenna structure 112, magnetic alignment structure 114, and a magnetic sensor such as a magnetometer 116. Wireless power receiving coil 110 may be configured to received wireless power signals from wireless power transmitting coil 120. For instance, wireless power transmitting coil 120 may be driven using inverter 61 in device 12 of FIG. 2, whereas wireless power receiving coil 110 may be used to drive rectifier 50 in device 24 of FIG. 2. Wireless charging coil 110 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

NFC antenna 112 may be formed around wireless charging coil 110 (e.g., NFC antenna 112 may be routed along the periphery of coil 110 and may at least partially or completely surround coil 110). In one suitable arrangement, wireless charging coil 110 and NFC antenna 112 may form concentric loop structures. NFC antenna structure 112 in device 100 should have the same or similar structure and footprint as NFC antenna structure 122 of device 102 to ensure optimal coupling between the two antenna structures.

Magnetic alignment structure 114 may be formed around NFC antenna 112 (e.g., alignment structure 114 may be formed along the periphery of antenna 112 and may at least partially or completely surround antenna 112). In some configurations, NFC antenna 112 and magnetic alignment structure 114 may form concentric loops. Magnetic alignment structure 114 in device 100 may magnetically couple with a corresponding magnetic alignment structure 124 in device 102 (e.g., magnets 114 may magnetically attract magnets 124 and vice versa). When magnetic alignment structure 114 in device 100 is coupled to magnetic alignment structure 124 in device 102, the power transmitting coil 120 may be aligned with the power receiving coil 110 (e.g., so that coils 110 and 120 are in proper spatial alignment for optimal wireless power transfer). The magnetic alignment structures thus promote proper alignment of the wireless power receiving coil with respect to the wireless power transmitting coil. Magnetic alignment structures 114 and 124 may be permanent magnets (e.g., formed from hard magnetic materials that retain their magnetism over time).

In accordance with an embodiment, devices 100 and 102 may communicate prior to wireless power transfer operations. These communications include communications to establish wireless power delivery. In some embodiments, these communications include negotiations that support features such as issuing a charging notification, chime, alert, or otherwise conveying the nature of the device 102, such that the user is informed as to the operation of their device. As an example, device 100 may receive information indicating that it has been placed on a wireless charging mat. In response, device 100 may present a wireless charging mat icon on its display to indicate that its battery is now charging from a wireless charging mat.

Communications may also include NFC-based communications. The NFC reader in device 100 may be triggered or activated using a magnetic sensor such as magnetometer 116. Magnetometer 116 is, for example, a Hall effect sensor, a rotating coil magnetometer, a magneto-resistive sensor, a fluxgate sensor, a microelectromechanical systems magnetic field sensor, or other types of magnetic sensors. In some embodiments, magnetometer 116 is multiple-axis magnetic sensor configured to decipher the polarity of attachment. When multi-axis magnetic sensor 116 detects that accessory 104 is coupled in a first, correct, orientation with device 100, further processing such as NFC communications are triggered. When multi-axis magnetic sensor 116 detects a magnetic reading that is unrecognized or indicates that an accessory has been coupled in a second, incorrect orientation (e.g., upside down), device 100 forgoes operations such as indicating the attachment via user notification. Magnetic sensor 116 may monitor or measure the magnetic field at magnetic alignment structure 114. When device 100 is not attached to device 102, magnetic sensor 116 may measure a first amount of magnetism that is below a threshold level. When device 100 is attached to device 102 (e.g., when structures 114 and 124 are aligned), magnetic sensor 116 may detect a second amount of magnetism that exceeds the threshold level. When the output of sensor 116 exceeds the threshold, magnetic sensor 116 may send a wake-up signal to the NFC reader in device 100. Operated in this way, magnetometer 116 may be used to trigger or initiate the NFC communications between devices 100 and 102.

In some embodiments device 100 presents an indication regarding the attachment of an accessory. For example, when a wireless power transmitter is inductively coupled with device 100, device 100 chimes audibly, and displays a battery charging icon and chines. In some embodiments, device 100 presents an indication regarding an attribute of an attached accessory. For example, when device 100 is coupled with a purple colored protective cover, device 100 presents an indication that it is coupled with a purple cover. In some embodiments, device 100 presents an indication regarding a functionality of an attached accessory. For example, when device 100 is coupled with a battery-powered protective cover, device 100 presents an indication that it is coupled with a purple cover, that the cover has a battery that is charged, and/or that it is receiving power from the battery-powered case. In some embodiments, device 100 presents an indication regarding an identity of an attached accessory. For example, when device 100 is coupled with a dock, device 100 presents an indication that is coupled with an unknown device and seeks permission to proceed further. Responsive to user permission to proceed, device 100 may indicate that the dock is named "Kitchen" and is associated with a number of food recipes that may be presented via device 100.

Figure 4:
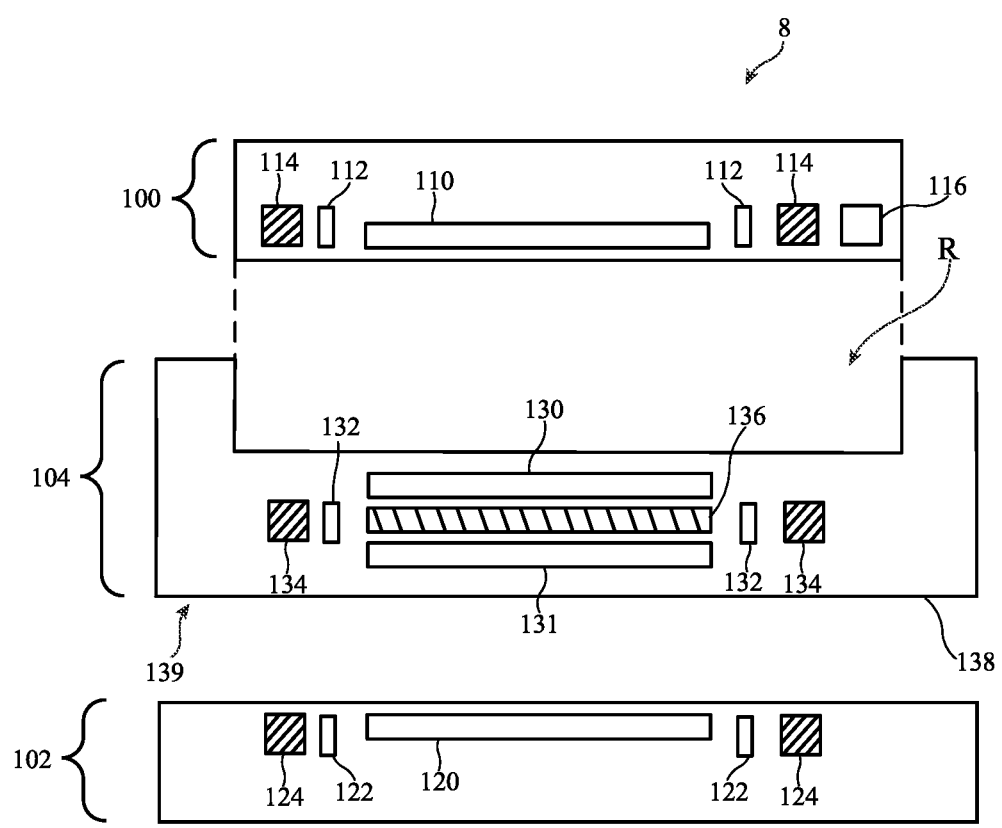
FIG. 4 is a cross-sectional side view of an illustrative wireless charging system in accordance with some embodiments.

FIG. 4 illustrates another suitable configuration in which portable electronic device 100 is inserted within battery case 104. Device 102 may be a wireless power transmitting device such as a wireless charging mat or puck with a charging surface. Device 104 has a housing such as housing 138 with a recess R and/or other structures configured to receive device 100. In this way, a user may removably attach device 100 to device 104 so that devices 100 and 104 may be used together as a portable unit. When it is desired to receive wireless power from device 102, devices 104 and 100 may be placed together on the charging surface of device 102. Device 104 optionally includes NFC antenna 132 and magnetic alignment structure 134. NFC antenna 132 allows device 104 to communicate with devices 100 and/or 102. Magnetic alignment structure 143 promotes spatial alignment and inductive coupling of device 104 with devices 100 and/or 102.

In some embodiments, devices 100 and 104 communicate using NFC antennas 112 and 132 respectively. In some examples, NFC communication occurs during wireless power handshake operations, by temporarily halting the power handshake/negotiation process to perform the NFC communications. In some examples, NFC communication occurs during wireless power transfer operations, by temporality halting the active wireless power transfer to perform the NFC communications. The NFC reader in device 100 may be triggered or activated using magnetic sensor 116, which monitors or measures the magnetic field at magnetic alignment structure 114. When device 100 is not attached to device 104, magnetic sensor 116 may detect a first amount of magnetism that is below a given threshold. When device 100 is attached to device 104 (e.g., when structures 114 and 134 are aligned), magnetic sensor 116 may measure a second amount of magnetism that exceeds the given threshold. When the output of sensor 116 exceeds the given threshold, magnetic sensor 116 may signal the NFC reader in device 100. Operated in this way, magnetometer 116 may be used to trigger or initiate the NFC communications between devices 100 and 104.

In the example of FIG. 4 in which portable electronic device 100 is attached to two different accessory devices, the audio, haptic, and/or visual affordance output by device 100 may be triggered upon attachment of each accessory or both accessories at the same time. For instance, device 100 may first be installed within device 104. When device 100 is placed within recess R in housing 138 of device 104, magnetic alignment structures 114 and 134 may spatially align devices 100 and 104 so that transmitting coil 130 is aligned with receiving coil 110. When magnetic alignment structures 114 and 134 are aligned, magnetic sensor 116 may detect the presence of device 104 and will activate NFC antenna 112 of the reader in device 100 to generate a magnetic field. The magnetic field generated by antenna 112 may induce a corresponding current to flow through antenna 132 of the NFC tag in device 104, thereby activating the NFC tag.

Figure 5:
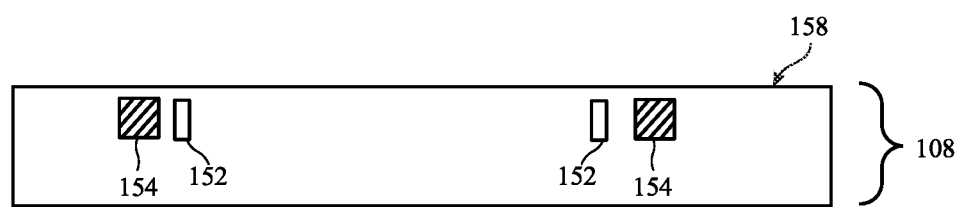
FIG. 5 is a diagram of an accessory configured to mate with a portable electronic device in accordance with some embodiments.

FIG. 5 is a side view of another accessory such as device 108 that may be attached to device 100. Device 108 may be a stand or dock for holding or otherwise supporting device 100 in an upright or semi-upright position. In some embodiments device 108 does not include a wireless charging coil. If desired, however, device 108 may be provided with one or more wireless charging coils. Device 106 includes NFC antenna 152 and magnetic alignment structure 154. Magnetic alignment structure 154 may be formed around NFC antenna 152 (e.g., magnetic alignment structure 154 may be routed along the periphery of antenna 152 and may at least partially or completely surround antenna 152). In one suitable arrangement, NFC antenna 152 and magnetic alignment structure 154 may form concentric loop structures. NFC antenna structure 152 in device 108 should have the same or similar structure and footprint as NFC antenna structure 112 of device 100 to ensure optimal coupling between the two antenna structures. NFC antenna 152 may be part of an NFC tag within device 108, which may be used to transmit device-specific information to NFC antenna 112 within device 100.

Magnetic alignment structure 154 in device 108 may magnetically couple with a corresponding magnetic alignment structure 114 in device 100 (e.g., magnets 114 may magnetically attract magnets 154 and vice versa). When magnetic alignment structure 154 in device 108 is coupled to magnetic alignment structure 114 in device 100, NFC tag antenna 152 may be aligned with the corresponding NFC reader antenna 112 in device 100 to carry out NFC communication.

In accordance with an embodiment, device 108 may be configured to transmit information to device 100 using NFC upon attaching to device 100 but prior to wireless power transfer operations so that device 100 may issue a notification, chime, alert, or otherwise display some confirmatory information about the coupling of device 108 to the user. As an example, device 100 may receive information from device 108 indicating that it has been inserted into a docking accessory. In response, device 100 may present a dock icon on its display to indicate that it is now attached to a dock accessory. In another example, device 100 may receive information from device 108 indicating that it has been attached to a dock named "kitchen". Device may present a kitchen icon on its display and/or may provide a default user interface screen that is associated with the dock.

Figure 6:
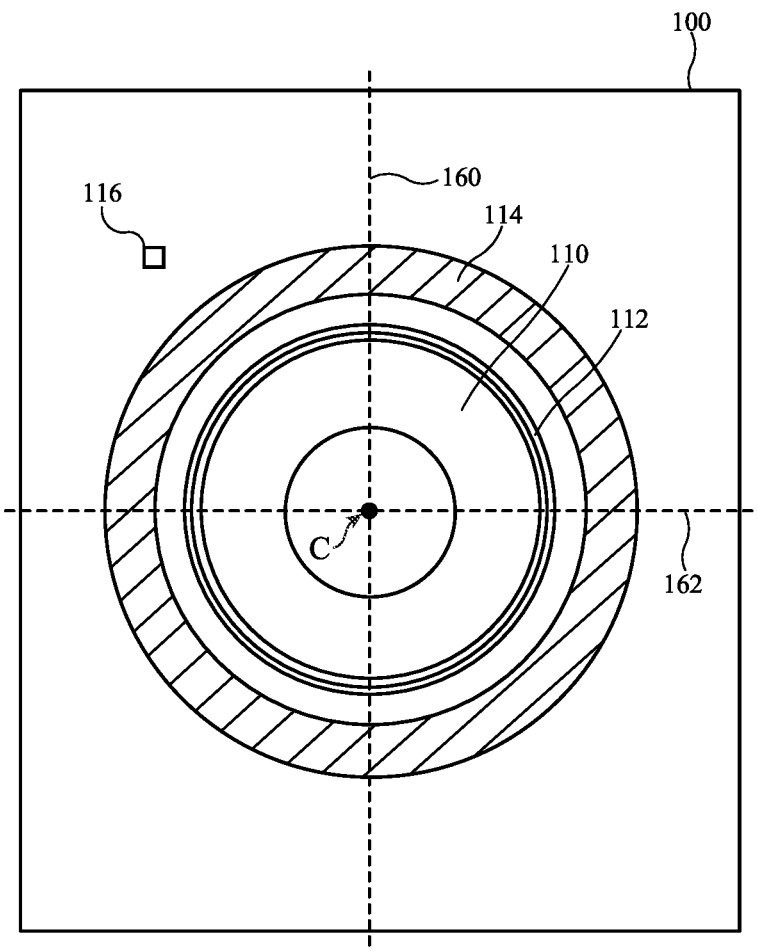
FIG. 6 is a top view of a portable electronic device in accordance with some embodiments.
Figure 7:
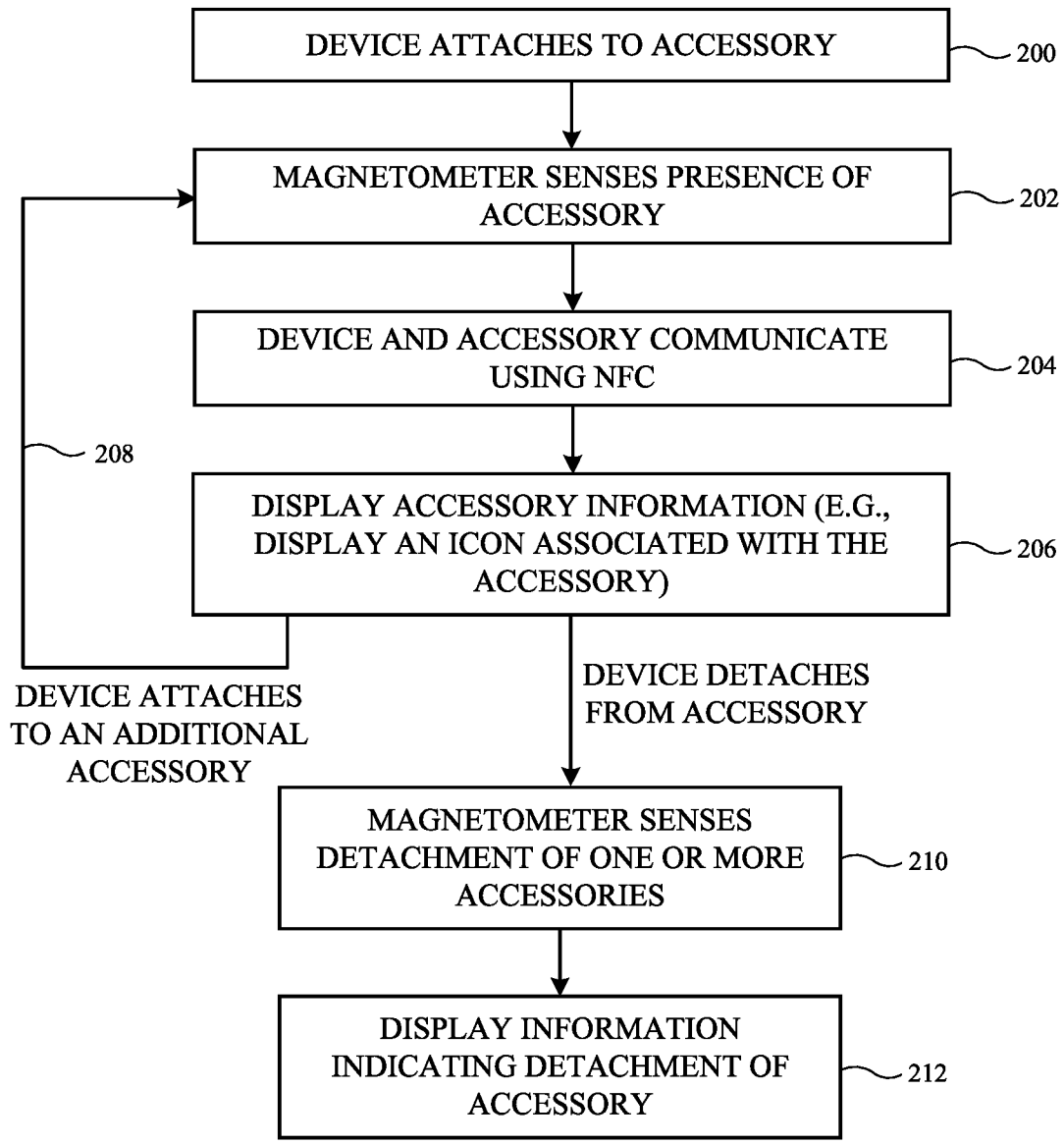
FIG. 7 is a flow chart of illustrative steps for using near-field communications circuitry to communicate between a portable electronic device and one or more accessories in accordance with some embodiments.

FIG. 6 is a top view of a wireless charging coil, NFC antenna, and magnetic alignment structures in an illustrative portable electronic device 100. As shown, device 100 includes one or more coils 110. Coil(s) 110 may be wrapped around or overlapping with a magnetic core. Coil 110 may be ring-shaped (sometimes referred to as an annular coil or circular coil), may have a central opening 164 with one or more magnetic cores optionally formed in the central opening. A ring-shaped NFC antenna 112 may laterally surround coil 110. Antenna structure 112 may sometimes be described as annular or circular. A ring-shaped magnetic alignment structure 114 may laterally surround NFC antenna 112. Magnetic alignment structure 114 may sometimes be described as annular or circular. In FIG. 7, coil 110, antenna 112, and magnetic alignment structure 114 are concentric (e.g., each structure 110, 112, and 114 may have a center coinciding at point C). Antenna 112 runs along a peripheral edge of wireless charging coil 110. Magnetic alignment structure 114 runs along a peripheral edge of NFC antenna 112. Concentric point C may bisect the horizontal width dimension across the housing of device 100 (as shown by bisecting line 160) and may also bisect the vertical length dimension across the housing of device 110 (as shown by bisecting line 162).

If desired, device 100 may include two or more wireless charging coils, NFC antenna 112 may be formed from two or more discrete antenna members arranged in a circular (annular) pattern, and magnetic alignment structure 114 may be formed from two or more discrete magnetic alignment members arranged in a circular (annular) pattern. Each of the discrete NFC antenna members and/or magnetic alignment members may have an arcuate arrangement. In other suitable embodiments, structures 110, 112, and 114 may be oval, triangular, rectangular, pentagonal, hexagonal, octagonal, or have another polygonal footprint.

Magnetic sensor 116 may be placed in close proximity to magnetic alignment structure 114 to effectively measure the magnetism of alignment structure 114. For example, magnetic sensor 116 and alignment structure 114 may be separated by a distance less than 1 cm, less than 0.5 cm, less than 1 mm, less than 0.5 mm, less than 0.1 mm, between 0.1 mm and 1 cm, between 0.1 mm and 1 mm, between 0.1 cm and 1 cm, between 0.1 cm and 0.5 cm, between 0.1 mm and 0.5 mm, or by other suitable distance.

Various arrangements of wireless charging coil (such as coil 110) NFC antenna (such as antenna 112), magnet (such as magnet 114) are possible consistent with the techniques described herein. In some embodiments, NFC antenna 112 is disposed along an outer periphery of magnet 114, and wireless charging coil 110 is disposed along the inner periphery of magnet 114. The positions of NFC antenna 112 and wireless charging coil 110 can be reversed. In some embodiments, both wireless charging coil 110 and NFC antenna 112 reside inside the inner periphery of magnet 114. The positions of wireless charging coil 110 and NFC antenna 112 can be reversed. In some embodiments, both wireless charging coil 110 and NFC antenna 112 reside outside the outer periphery of magnet 114. The positions of wireless charging coil 110 and NFC antenna 112 can be reversed. These examples are illustrative.

FIG. 7 is a flow chart of exemplary processes involved in attaching a portable electronic device to one or more accessory devices in accordance with embodiments described herein. At block 200, a device such as portable electronic device 100 (FIG. 1) is attached to an accessory device (e.g., power transmitting device 12 of FIG. 1, power transmitting and receiving device 18 of FIG. 1, device 102 of FIG. 3, device 104 of FIG. 4, device 108 of FIG. 5) via magnetic alignment structures (e.g., structures 114 and 124 of FIG. 3, structures 114 and 134 of FIG. 4).

At block 202, magnetic sensor 116 of portable electronic device 100 detects the presence of the accessory device that has just been attached to device 100. In response to magnetic sensor 116 detecting appropriate attachment of an accessory device, at block 204 (FIG. 8), NFC components in device 100 and the attached accessory communicate with one another. In some embodiments, NFC communications include verifying the authenticity of the attached devices. In some embodiments, NFC communications include encryption. In some embodiments, NFC communications include transfer of information regarding device 100 and/or the accessory. In some examples, device 100 obtains information indicative of the type of accessory that has been attached, such as whether the accessory is a dock. In some examples, device 100 obtains information indicating functionalities provided by the attached accessory, such as whether the accessory provides power.

At block 206, device 100 presents information about the attached accessory on its display using the information received during block 204. For example, device 100 may display a wireless charging puck graphic or a phone case graphic, responsive to determining that a wireless charging puck or a phone case, respectively, has been attached to device 100. Device 100 may also display a charging icon if device 100 is receiving power, such as wireless power signals, from the attached accessory. A functionality of device 100 may be made available or made unavailable based on the information received from the attached accessory. That is, certain applications may be enabled when device 100 is attached to a certain type of accessory. Also, certain applications may be disabled when device 100 is attached to a certain type of accessory. Device 100 may also alter its menu of available functions, such as the widget and application icons, based on information received from an attached accessory.

As indicated by branch 208, device 100 may repeat blocks 202-206 as additional devices are attached. For example, device 100 may attach to wireless charging puck through an intervening protective case.

When device 100 is detached from an accessory, magnetic sensor 116 may sense the removal of the accessory at block 210, and present information about the detachment in block 212. The presentation of information includes one or more of an audio, haptic, and visual indications. When device 100 is detached from an accessory, device 100 may also note the location of detachment, and later present lost-and-found information. For example, the detaching of device 100 from a car mount provides a meaningful parking location for the car, and the parking location could be presented in a map of the local area.

Figure 8:
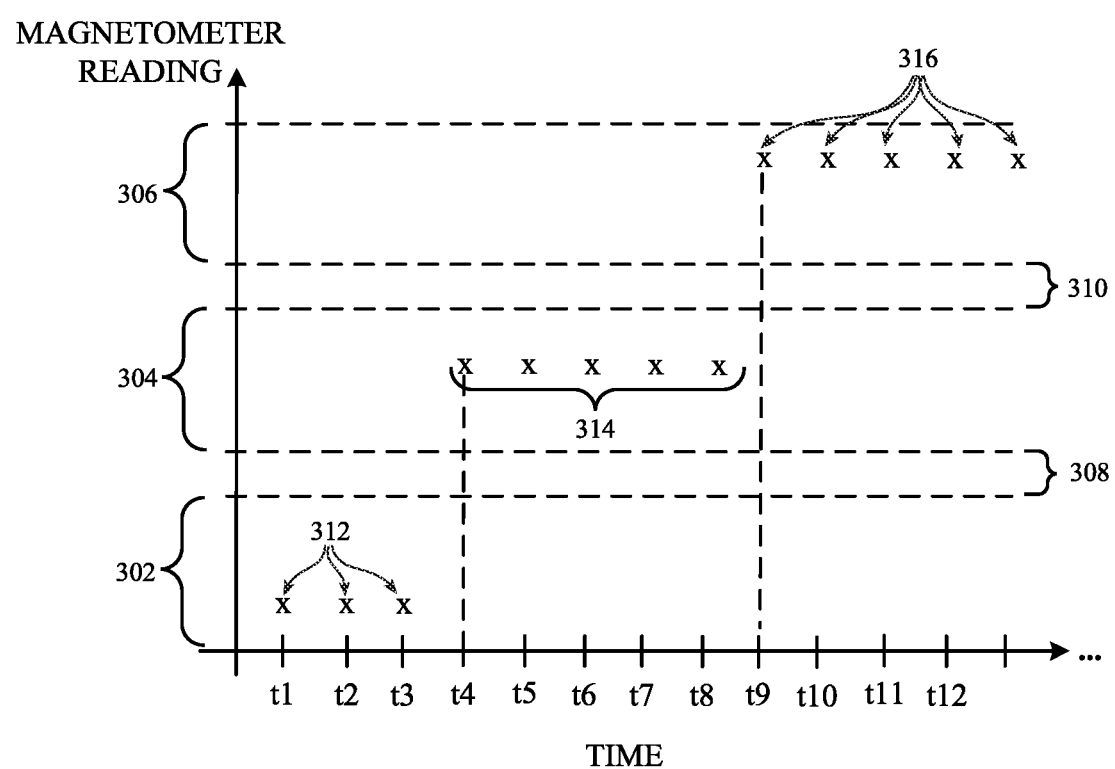
FIG. 8 is a timing diagram illustrating how a magnetometer can be used to detect the presence of one or more accessories in accordance with an embodiment.

FIG. 8 is a timing diagram illustrating how magnetic sensor 116 of device 100 (FIG. 1) may detect attachment and detachment of accessories to device 100, such as during blocks 202 and 210 of FIG. 7, respectively. Sensor 116 may be configured to gather measurements at a predetermined time interval. For example, sensor 116 may gather one or more readings once per second (with a frequency of 1 Hz), twice per second (with a frequency of 2 Hz), three times per second (with a frequency of 3 Hz), more than three times per second (with a frequency greater than 3 Hz), 3-10 times per second, less than once per second, at most once every two seconds, at most once every three seconds, or at other suitable periodicity.

FIG. 8 illustrates exemplary measurements 312 at times t1, t2, and t3, provided by sensor 116. These magnetic measurements lay within a first range of values 302. Magnetic sensor outputs within range 302 may be indicative that no external accessory or magnetic component is presently attached to device 100. At time t4, a first accessory (e.g., a battery case) may be installed on device 100. During the attachment of device 100 and the battery case, the magnetic alignment structure within the battery case may be magnetically coupled to and aligned with magnetic alignment structure 114 of device 100. Sensor 116 may detect the approach and proximity of the battery case and output second magnetic measurements 314 lying within a second range of values 304. Magnetic sensor readings falling within range 304 may be indicative that one external accessory is presently attached to device 100. Ranges 302 and 304 may be separated by a trigger gap 308 to ensure that there is adequate margin to help differentiate between the first scenario where no accessory is present and the second scenario where one accessory is attached.

At time t9, device 100 and the battery case, as one movable unit, may be placed on a second accessory (e.g., a wireless charging mat or puck). When the battery case is placed on the charging surface of the second accessory, the magnetic alignment structure within the battery case may be magnetically coupled to and aligned with the magnetic alignment structure of the second accessory and with magnetic alignment structure 114 of device 100. As a result, sensor 116 within device 100 may output second magnetic measurements 316 lying within a third range of values 306. Magnetic sensor readings falling within range 306 may be indicative that two external accessories are presently attached to device 100 (i.e., device 100 is presently stacked with at least two external accessories). Ranges 306 and 304 may be separated by a trigger gap 310 to ensure that there is adequate margin to help differentiate between the second scenario where one accessory is attached to device 100 and a third scenario where device 100 is attached or coupled to at least two accessories. In this illustrative example of FIG. 9, magnetic sensor 116 distinguishes between the attachment of zero, one, or multiple external accessories.

The near-field communications reader in device 100 may perform anti-collision operations when multiple external accessories are detected. For example, a first near-field communications tag in a first accessory and a second near-field communications tag in a second accessory may both want to transmit information to the reader of device 100. When detecting such potential collision, the near-field communications reader of device 100 may communicate with only one of the tags while communications with the other tag is halted. After communications with the first tag is complete, the reader can then proceed to communicate with the second tag.

Other sensing techniques are possible. In some examples, multiple magnetic sensors may be used. In some examples, NFC communication can be used to detect the presence of multiple attached accessories once a magnetic sensor has indicated the presence of at least one attached accessory. In some embodiments, device 100 uses NFC to detect when one or more accessories have been attached, instead of magnetic sensor 116. An NFC reader may periodically transmit NFC pings to detect whether an accessory has been coupled to the housing of device 100.

Figure 9:
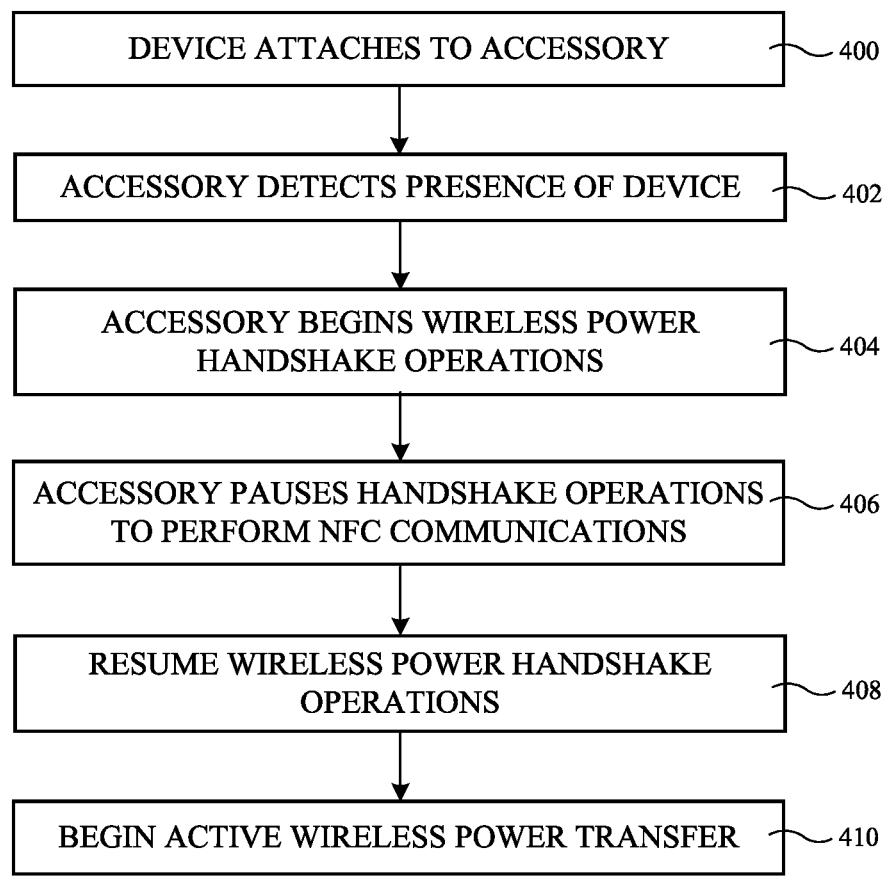
FIG. 9 is a flow chart for performing near-field communications in accordance with some embodiments.
Figure 10:
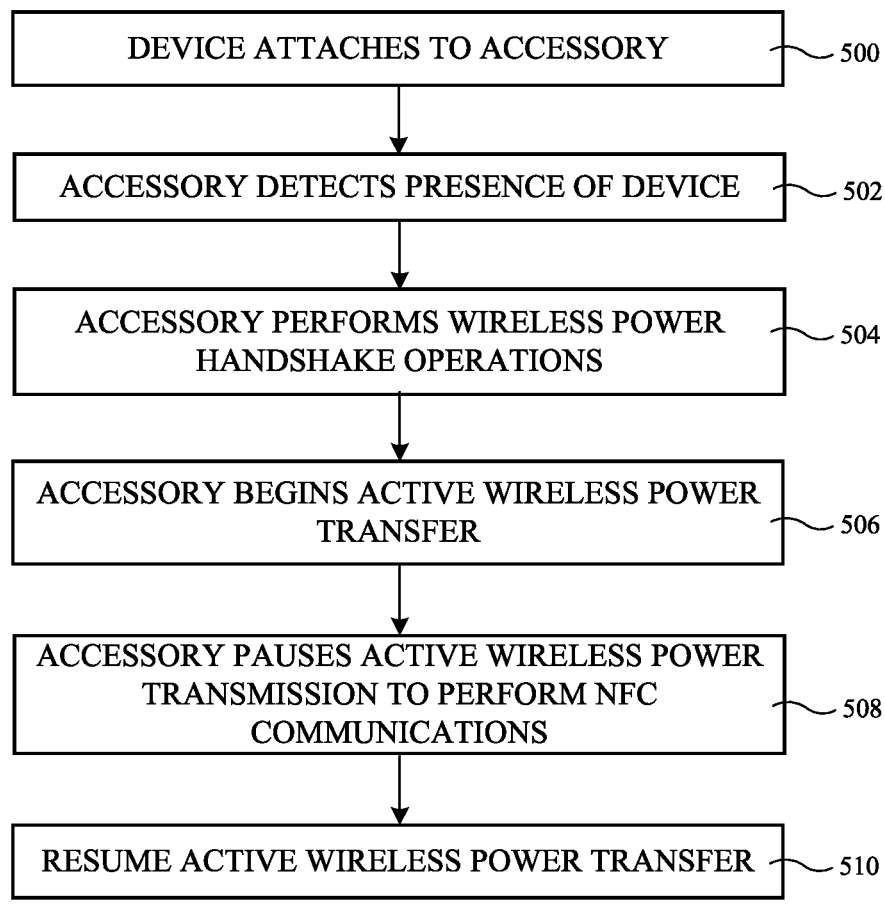
FIG. 10 is a flow chart for performing near-field communications in accordance with some embodiments.

Turning to FIGS. 9 and 10, exemplary techniques for communicating using NFC and wireless charging signals are described. Careful sequencing in the use of NFC and wireless charging signal can improve and mitigate interferences between the wireless operations. FIG. 9 is a flow chart of illustrative processes for performing NFC communications by pausing wireless power handshake operations in accordance with some embodiments.

At block 400, portable electronic device 100 is attached to an accessory such as wireless power transmitting device 12 of FIG. 1. At block 402, the accessory detects the presence of portable electronic device 100. At block 404, power transmitting accessory 12 begins wireless power handshake operations with portable electronic device 100. These handshaking operations may include authentication, negotiation of supported communication protocols and power transfer levels, and so forth. At block 406, power transmitting accessory 12 pauses the wireless power handshake operations so that NFC communications can be performed between NFC components in devices 12 and 100. In some embodiments these NFC communications include those described with reference to block 204 of FIG. 7. At block 408, after the NFC communications, power transmitting accessory 12 resumes the wireless power handshake operations. At block 410, after the needed handshake and power negotiation operations are performed, wireless power transmitting accessory 12 begins active wireless power transfer by sending wireless power signals at appropriate (e.g., negotiated) levels to portable electronic device 100. During active wireless power transfer in block 410, devices 12 and 100 may further communication with one another, such as via in-band communication, to convey control and/or feedback signals to sustain wireless power transfer.

The example of FIG. 9 in which device 100 is attached to a power transmitting accessory is merely illustrative. As another example, device 100 can also be attached to an accessory such as power transmitting and receiving device 18 of FIG. 1. In such scenarios, device 100 can communicate with the accessory via near-field communications and determine whether to then either transmit wireless power to the accessory or receive wireless power from the accessory.

FIG. 10 is a flow chart of illustrative processes for performing near-field communications by pausing active, on-going wireless power transmission in accordance with some embodiments. In some embodiments, the NFC communications operations during block 204 of FIG. 8 is performed after wireless power transmitting device 12 and portable electronic device 100 have negotiated for and begun wireless power transfer.

At block 500, portable electronic device 100 is attached to an accessory such as wireless power transmitting device 12 of FIG. 1. At block 502, wireless power transmitting accessory 12 detects the presence of portable electronic device 100. At block 504, wireless power transmitting accessory 12 begins wireless power handshake operations with portable electronic device 100. These handshaking operations may include authentication, to negotiation of supported communication protocols and power transfer levels, so forth. At block 506, after the handshake and power negotiation operations are performed, wireless power transmitting accessory 12 begins active wireless power transfer at appropriate (e.g., negotiated) levels. During operations of block 506, the power transmitting accessory may transmit wireless power signals to device 100 via the wireless power charging coils and may optionally perform in-band communications to convey control and data signals between the two devices.

At block 508, wireless power transmitting accessory 12 pauses the active wireless power transfer operations (e.g., by temporarily halting the wireless power transmission and operating the accessory in a wireless-power-transfer-halted mode). During the wireless-power-transfer-halted mode, near-field communications can be performed between the NFC circuitry in devices 12 and 100. In some embodiments these NFC communications include those described with reference to block 204 of FIG. 8. At block 510, after the needed NFC communications are performed, wireless power transmitting device 12 resumes active wireless power transfer operations.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing describes exemplary embodiments of wireless power transfer systems utilizing NFC communications. This information can be beneficially used to control efficient wireless charging operations and to appraise users of characteristics of accessories that are inductively coupled with their device. It is contemplated that some implementers of the present technology may consider the passage of identifiers, such as serial numbers, UIDs, manufacturer IDs, MAC addresses, or the like, to aide in the identification and handling of devices in a wireless charging system.

Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a wireless power transmitter.

It is the intent of the present disclosure that personal information data, if any, should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, a device identifier may be masked to convey the characteristics of the device without uniquely identifying the device. De-identification may be facilitated, when appropriate, by removing identifiers, controlling the amount or specificity of data stored, controlling how data is stored, and/or other methods such as differential privacy. For example, a dock that has been paired with a user device may identify itself using minimally required information, such as a byte value of 0x00000001. While devices that have been explicitly paired by the user may understand that 0x00000001 refers to a Kitchen dock, the bit value of 0x00000001 itself does not inherently convey this level of information. Robust encryption may also be utilized to reduce the likelihood that communication between inductively coupled devices are spoofed or intercepted. NFC authentication can provide additional protection by preventing certain information from being exchanged with an unauthorized NFC device.

Entities responsible for the collection, analysis, disclosure, transfer, storage, or other use of any personal information data should comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

The foregoing is merely illustrative and various modifications can be made to the described embodiments. The foregoing embodiments may be implemented individually or in any combination.

What is claimed is:

1. An electronic device comprising:
   a coil configured to receive wireless power from a power transmitting device;
   a magnetic structure surrounding the coil, wherein the magnetic structure is configured to magnetically couple to a corresponding magnet in the power transmitting device to align the coil with a wireless power transmitting coil in the power transmitting device; and
   a magnetometer configured to distinguish between:
   (1) a first condition in which the electronic device is magnetically coupled to an external accessory using the magnetic structure without being magnetically coupled to the power transmitting device; and
   (2) a second condition in which the electronic device is magnetically coupled to both the external accessory and the power transmitting device using the magnetic structure.

2. The electronic device of claim 1, further comprising:
   an output device configured to:
   present a visual output associated with the external accessory in response to detecting the first condition in which the electronic device is magnetically coupled to the external accessory using the magnetic structure without being magnetically coupled to the power transmitting device; and present a visual output associated with the power transmitting device in response to detecting the second condition in which the electronic device is magnetically coupled to both the external accessory and the power transmitting device using the magnetic structure.

3. The electronic device of claim 1, further comprising:
an output device configured to present a visual output associated with the power transmitting device in response to detecting the second condition in which the electronic device is magnetically coupled to both the external accessory and the power transmitting device using the magnetic structure.

4. The electronic device of claim 1, wherein the external accessory comprises a protective case and wherein the power transmitting device comprises a wireless charging puck.

5. The electronic device of claim 1, further comprising:
a near-field communications antenna surrounding the coil, wherein the near-field communications antenna is configured to receive information from the external accessory in response to detecting the first condition in which the electronic device is magnetically coupled to the external accessory using the magnetic structure without being magnetically coupled to the power transmitting device.

6. The electronic device of claim 5, wherein the near-field communications antenna is further configured to receive information from the power transmitting device in response to detecting the second condition in which the electronic device is magnetically coupled to both the external accessory and the power transmitting device using the magnetic structure.

7. The electronic device of claim 1, further comprising:
a near-field communications antenna surrounding the coil, wherein the near-field communications antenna is configured to receive information from the power transmitting device in response to detecting the second condition in which the electronic device is magnetically coupled to both the external accessory and the power transmitting device using the magnetic structure.

8. The electronic device of claim 1, wherein the magnetometer is further configured to detect decoupling of the power transmitting device from the electronic device.

9. The electronic device of claim 1, wherein the magnetometer is further configured to detect decoupling of the external accessory from the electronic device.

10. An electronic device comprising:
a wireless charging coil;
a magnetic structure concentric with the wireless charging coil; and
a magnetometer configured to distinguish between:
(1) a first scenario in which the electronic device is magnetically coupled to a magnet in an external object using the magnetic structure; and
(2) a second scenario in which the electronic device is magnetically coupled to magnets in a plurality of external objects using the magnetic structure.

11. The electronic device of claim 10, further comprising:
a near-field communications antenna concentric with the wireless charging coil, wherein the near-field communications antenna is configured to receive information associated with the external object in response to the magnetometer detecting the first scenario.

12. The electronic device of claim 11, further comprising:
a display configured to present a visual output associated with the external object based on the received information.

13. The electronic device of claim 11, further comprising near-field communications circuitry configured to distinguish between the first and second scenarios.

14. The electronic device of claim 10, wherein the magnetometer comprises a multi-axis magnetic sensor configured to distinguish between the first and second scenarios.

15. An electronic device comprising:
a wireless charging coil;
a magnetic alignment structure surrounding the wireless charging coil; and
a magnetometer configured to distinguish between:
(1) a first scenario in which the electronic device is magnetically coupled to a magnet in an external object using the magnetic alignment structure; and
(2) a second scenario in which the electronic device is magnetically coupled to magnets in two different types of external objects using the magnetic alignment structure.

16. The electronic device of claim 15, wherein the magnetometer comprises a multi-axis magnetic sensor configured to output a first reading in response to detecting the first scenario and to output a second reading different than the first reading in response to detecting the second scenario.

17. The electronic device of claim 15, wherein:
the external object to which the electronic device is magnetically coupled in the first scenario comprises an accessory selected from the group consisting of: a wireless charging mat, a wireless charging puck, a removable case, a battery case, and a dock; and
the two different types of external objects to which the electronic device is magnetically coupled in the second scenario comprise a removable case and a wireless charging puck.

18. The electronic device of claim 15, further comprising:
a near-field communications antenna surrounding the wireless charging coil, wherein the near-field communications antenna is configured to receive information from the external object to which the electronic device is magnetically coupled in the first scenario; and
a display configured to present a visual output associated with the external object based on the received information.

19. The electronic device of claim 18, wherein:
the wireless charging coil is concentric with the magnetic alignment structure; and
the wireless charging coil is concentric with the near-field communications antenna.

20. The electronic device of claim 15, further comprising near-field communications circuitry configured to distinguish between the first and second scenarios.

* * * * *